UNITED STATES PATENT OFFICE.

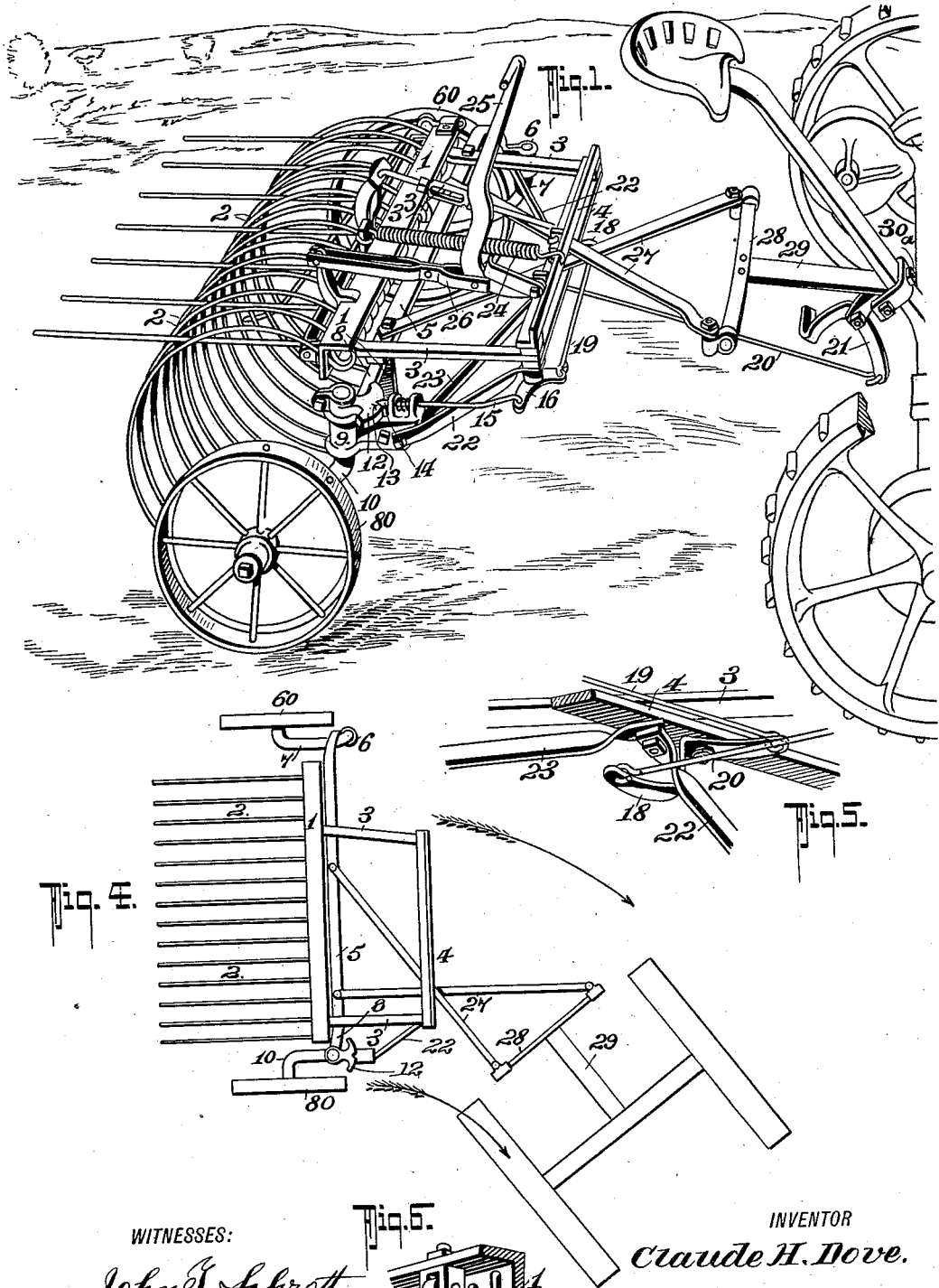

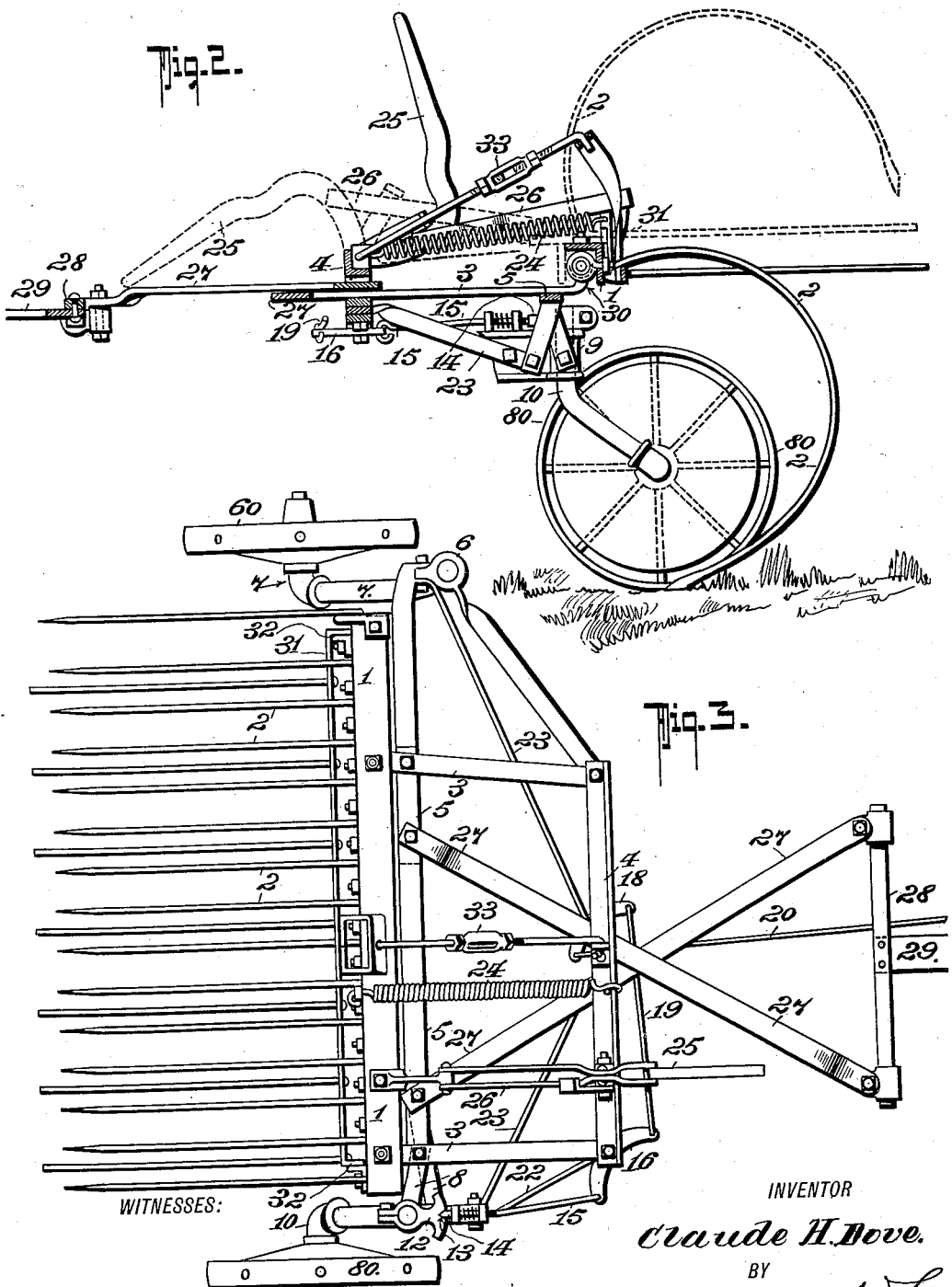

CLAUDE H. DOVE, OF LYNN, NEBRASKA.

RAKE ATTACHMENT FOR MOWERS.

1,077,262.  Specification of Letters Patent.  Patented Nov. 4, 1913.

Application filed June 10, 1912. Serial No. 702,860.

*To all whom it may concern:*

Be it known that I, CLAUDE H. DOVE, residing at Lynn, in the county of Morrill and State of Nebraska, have invented a new and Improved Rake Attachment for Mowers, of which the following is a specification.

This invention is in the nature of an improved raking attachment especially designed for being attached to any of the well known types of mowing machines, and in such a manner, whereby, after one round is mowed, the attachment can be set to a raking position to gather the first mowed round, and afterward, successively gather the other mowed rounds.

Another object of my invention is to provide an improved inexpensively made, easily manipulated hand dumped raking attachment for mowers, and the same consists in the peculiar construction and novel arrangement of parts hereinafter fully explained, specifically pointed out in the appended claims and illustrated in the accompanying drawings, in which:

Figure 1, is a perspective view of my invention, so much of a mowing machine being shown necessary to illustrate the practical application of my raking attachment. Fig. 2, is a longitudinal section of the raking attachment, the rake teeth being shown at the elevated position in dotted lines. Fig. 3, is a plan view thereof. Fig. 4, is a diagrammatic top plan view showing the relative positions of the mower and the raking attachment in turning corners. Fig. 5, is a detail inverted perspective showing the central bell crank lever and the latch operating rods which are connected thereto. Fig. 6, is a detail perspective view of the rake head pivot.

In the practical arrangement, my attachment comprises an angle bar 1, that forms the rake head, since the rake teeth 2 are attached thereto in any well-known manner. Bar 1 is hingedly mounted at 30 to swing in the vertical plane, on the rear ends of side bars 3—3, the forward ends of which are joined to the outer extremities of a pair of parallel cross bars 4—4, that form a guide and support for the draft members presently again referred to.

5 designates the main axle supporting member which also supports the pivot arms 3 before referred to. Member 5 is projected at one end and bolts to the supporting box 6, the extension 7 of which forms the bearing for one of the wheels 60, while at the other end its extension comprises braces 8 which bolt to the bearing box 9, in which moves the axle 10 of the wheel 80. Axles 7 and 10 are normally held in their boxes 6 and 9, so as to allow the wheels to be moved as caster wheels, but one of the wheels, by adjustments to be described, is held from turning in its supporting bearing when the machine is moving forwardly.

12 designates a segment which is clamped onto the end of the member 10, and is formed with a detent 13 by which means, together with its engagement with the latch 14, the axle 10 and wheel 80 are held from lateral movement. Latch 14 which is spring pressed to its locking position has a semi-flexible extension 15 which pivots onto a bell-crank lever 16 in turn pivoted to the framing. 18 is another bell crank lever stepped as shown in Fig. 5, to which is connected rod 19 leading from lever 16, and pull rod 20 which connects to the opposite end of said lever. Rod 20 extends to the foot lever 21 adjacent the driver's seat, by means of which, when it is desired to back the machine, the operator, by pushing the foot lever, pulls the latch 14 out of the detent 13 and in consequence, the vertical portion of the axle 10 forms a vertical pivot for the "crazy" wheel 80 at that side to permit backing the mower and the attachment, it being obvious that so soon as the foot lever is released, the detent 13 and latch 14 can be readily brought into position again to lock the wheel 80 to its former position.

22—23 designate brace rods that connect the boxes 6 and 9 with the front frame portion, so that a rigid structure may be maintained.

24 is a stout coil spring, one end of which joins with the front frame portion and the other end with the projecting portion of the angle bar 1 that forms the rake head, the purpose of said spring connection being to hold the rake head in its swung-up position and also to assist in withdrawing the teeth from the raking position.

25 is a hand lever connected to a lift bar 26 hingedly mounted on one of the cross bars 4 and fixedly connected to the rake head 1, the said lever being disposed close up to the driver's seat on the mower.

27—27 designate draft rods that pivotally engage with the arched member 5 and pass out between the bars 4—4, and cross each other, their front ends being pivotally connected by a yoke 28 to which is fixedly connected a clamp bar 29 which, in turn is clamped to the seat spring by a bolt 30ª which also serves to hold the foot lever support.

While in this application I do not specifically make any claim to a rake cleaner, yet as it is a necessary adjunct to a rake, I have disclosed a rake cleaner in the drawings. The rake cleaner 31 shown is pivotally mounted at 32 to the rake head 1 and held in a relatively fixed position by a yoke and turn-buckle rod connection 33, so that when the rake head 1 is swung upwardly on its pivot to the dotted line position shown in Fig. 2, the cleaner will also follow, but swinging on its pivot until it reaches the dotted line position, shown, the arc of movement thereof being less that that of the rake proper, will cause a cleaning away of any adhering material on the rake teeth 2.

From the foregoing, taken in connection with the drawings the complete construction, the advantages and the operation of my invention will be readily apparent. By locking one of the pivot wheels so it coacts with the drag wheel at the other end makes the rake follow directly in the wake of the mower. It should be understood that both wheels 60 and 80 are adapted to swivel in their bearings 6 as caster wheels, the wheel 60 being free to swivel at all times, while the wheel 80 is locked from movement when the machine is moving forward.

By the use of my invention much time is saved since a man and team such as usually required to follow up the mower, is dispensed with. Furthermore, the use of my improvement prevents bleaching as the attachment takes up the hay almost immediately after it is cut, thereby making it especially useful for silos.

What I claim is:

1. A raking attachment for mowers; comprising a sulky frame, said frame including an arched axle, a caster wheel at each end of the axle, a locking device for normally holding one of the caster wheels from swiveling with relation to said arched axle, and means operable from the mowing machine for releasing the said locking device to permit said wheel to swivel with relation to said arched axle, draft devices for connecting the sulky frame with the mowing machine, and a rake head mounted on the sulky frame.

2. A raking attachment for mowers; comprising a sulky frame, said frame including an arched axle, a caster wheel at each end of the axle, draft devices for detachably connecting the sulky frame with the mowing machine, a rockable rake head mounted on the sulky frame, means for holding the rake head down to its raking position, and a lever device operable from the mowing machine for dumping the rake.

3. In combination with the mowing machine having a rearwardly extending seat; an attachment comprising a sulky frame, including an arched axle and a caster wheel at each end of the axle, a draft rigging connecting said sulky frame with the mowing machine, a rockable rake head mounted on the sulky frame, means for holding the rake head down to its raking position, and a lever device for dumping the rake, said lever device including an operating lever mounted on the sulky frame and projecting to a point adjacent to the mowing machine's seat.

4. In a raking attachment for mowers, a frame comprising a main axle supporting member, bearing boxes mounted on the ends of said member, caster wheels mounted in said bearing boxes, front frame cross bars, side bars connecting said front frame cross bars with said axle supporting member, diagonal brace rods connecting said front frame cross bars with the ends of said axle supporting member, a rake including rake teeth, and an angle bar forming a rake head for said teeth, means pivotally connecting said angle bar with said side bars, a lever mounted on said front bars and projectable adjacent to the mowing machine, a connection between said lever and said angle bar by virtue of which as said lever is moved forwardly said rake will be lifted, and means for holding said rake in its elevated position.

CLAUDE H. DOVE.

Witnesses:
C. D. HENDERSON,
C. C. SCANLON.